US007263131B2

(12) United States Patent
Ha et al.

(10) Patent No.: US 7,263,131 B2
(45) Date of Patent: Aug. 28, 2007

(54) OFDM-BASED TIMING SYNCHRONIZATION DETECTION APPARATUS AND METHOD

(75) Inventors: Tae-hyeun Ha, Seoul (KR); Jae-seok Kim, Gyeonggi-do (KR); Seong-joo Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 720 days.

(21) Appl. No.: 10/702,034

(22) Filed: Nov. 6, 2003

(65) Prior Publication Data

US 2004/0156308 A1   Aug. 12, 2004

(30) Foreign Application Priority Data

Nov. 7, 2002   (KR) .................. 10-2002-0068760

(51) Int. Cl.
*H04K 1/10* (2006.01)
(52) U.S. Cl. ........................................ 375/260
(58) Field of Classification Search ........... 375/260, 375/354; 370/208, 430
See application file for complete search history.

(56) References Cited

U.S. PATENT DOCUMENTS

| 6,021,421 | A | * | 2/2000 | Retter et al. ............... 708/422 |
| 2002/0126768 | A1 | * | 9/2002 | Isaksson et al. ........... 375/298 |
| 2003/0161278 | A1 | * | 8/2003 | Igura ........................ 370/320 |

\* cited by examiner

*Primary Examiner*—Don N. Vo
(74) *Attorney, Agent, or Firm*—Staas & Halsey LLP

(57) ABSTRACT

An orthogonal frequency division multiplexing (OFDM)-based synchronization detection apparatus includes an input register that stores data, a shifter that shifts the data from the input register based on the exponent of a quantized correlation coefficient, an adder that sums the shifted data, and a peak detector that determines the peak value from among the summed shifted data. The OFDM-based synchronization detection method involves quantizing correlation coefficients for synchronization detection into $2^n$-level quantized correlation coefficients (n is an integer not less than 0), shifting input data using the $2^n$-level quantized correlation coefficients, and detecting synchronization using a shifting result.

15 Claims, 5 Drawing Sheets

| ITEMS | NUMBER OF GATES | |
| --- | --- | --- |
| | CONVENTIONAL SYSTEM | PROPOSED SYSTEM |
| MULTIPLIERS (8x8) | 16 | 0 |
| REGISTER (8-bit) | 15 | 15 |
| ADDER | 1 (16-bit) | 1 (11-bit) |
| TOTAL GATE NUMBER | 9495 (100%) | 978 (10.3%) |

OFDM-BASED TIMING SYNCHRONIZATION DETECTION APPARATUS AND METHOD

CROSS-REFERENCE TO RELATED APPLICATIONS

This application claims the priority of Korean Patent Application No. 2002-68760, filed on Nov. 7, 2002, in the Korean Intellectual Property Office, the disclosure of which is incorporated herein in its entirety by reference.

BACKGROUND OF THE INVENTION

1. Field of the Invention

The present invention relates to a method and an apparatus for detecting synchronization at a reception end of an orthogonal frequency division multiplexing (OFDM) transmission system, and more particularly, to a method and an apparatus for detecting synchronization using $2^n$-level quantized correlation coefficients.

2. Description of the Related Art

Orthogonal frequency division multiplexing (OFDM) systems have been adopted for European digital broadcasting receivers (DVB-T) and high-speed wireless local area network (WLAN) services. Such OFDM systems take advantage of orthogonal subcarrier waves and are considered good at eliminating inter-channel interference (ICI) and inter-symbol interference (ISI) due to a guard interval inserted into each symbol. For these reasons, the OFDM systems have been adopted in the high-speed WLAN standard IEEE802.11a.

According to WLAN standards, a transmission data structure is comprised of a preamble and data, and the preamble is comprised of two sub-preambles. A first sub-preamble is comprised of 10 short training symbols, and each of the short training symbols is comprised of 16 samples. FIG. 1 is a diagram illustrating such a transmission data structure according to WLAN standards. Referring to FIG. 1, each transmission data structure includes sub-preamble 1 (100), sub-preamble 2 (110), and data (120). The sub-preamble 1 (100) includes short training symbol 1 (130), short training symbol 2 (140), . . . , and short training symbol 10 (150). Short training symbol 1 (130) includes sample 1 (131), sample 2 (132), sample 3 (133), . . . , and sample 16 (134). These short training symbols are used for detecting signals and temporally synchronizing received frames at a reception end.

A WLAN timing synchronization system detects timing synchronization by using a correlator to cross-correlate input signals. Short training symbols defined by the WLAN standards are used in a reception system as correlation coefficients. Supposing that input preambles are associated with correlation coefficients, a correlation value can be expressed by Equation (1) below.

$$\Lambda(n) = \sum_{m=1}^{M} r(n+m)c^*(m) \quad (1)$$

In Equation (1), r(n+m) represents input data, M represents the number of samples of each short training symbol, and c*(m) represents a conjugate form of c(m). Furthermore, c(m) represents a short training symbol defined by the WLAN standards.

A maximum of $\Lambda(n)$ corresponds to a correlation peak. Therefore, by figuring out whether and where the correlation peak exists, timing synchronization can be carried out.

FIG. 2 is a block diagram of a conventional correlator 200. In FIG. 2, c*15 through c*0 represent correlation coefficients each comprised of a short training symbol.

The correlator 200 includes a register unit 210, a multiplication unit 220, a pipelined adding unit 230, and a peak detection unit 240. The register unit 210 includes 16 registers that each store a sample of the input data. The multiplication unit 220 includes 16 multipliers that multiply correlation coefficients c*15 through c*0 by outputs of the 16 registers, respectively. The pipelined adding unit 230 adds the outputs of the multiplication unit 220, and the peak detection unit 240 detects a peak value among outputs of the pipelined adding unit 230.

More specifically, data samples are sequentially input into the register unit 210 in the correlator 200, and at every clock cycle, the input data samples are moved from the current registers and temporarily stored in registers to the right of the current registers. A data sample output from a register of the register unit 210 is multiplied by its corresponding correlation coefficient through its corresponding multiplier in the multiplication unit 220. Such multiplication results are output to the pipelined adding unit 230 and then summed up. For example, if n=0 in a predetermined clock cycle, input data r0 through r15 is multiplied by corresponding correlation coefficients, and then the multiplication results are added by the pipelined adding unit 230. Then, if n=1 in a following clock cycle, input data r1 through r16 is multiplied by corresponding correlation coefficients, and then the multiplication results are added by the pipelined adding unit 230. In other words, such adding and multiplication processes are carried out in every clock cycle. By monitoring outputs of the pipelined adding unit 230, the peak detection unit 240 detects a peak value among the outputs of the pipelined adding unit 230.

In a WLAN environment, it is hard to develop a high-speed correlator with one multiplier. Therefore, as shown in FIG. 2, a correlator comprised of multipliers, registers, and an adder is used. Such a correlator requires as many multipliers as there are correlation coefficients, which contributes to a correlator system with a complex hardware structure and could serve as a big obstacle to the design of an effective WLAN system.

SUMMARY OF THE INVENTION

The present invention provides an OFDM-based timing synchronization detection apparatus and method, which are capable of simplifying receiver hardware structure without deteriorating the performance of the hardware structure.

According to an aspect of the present invention, there is provided an orthogonal frequency division multiplexing (OFDM)-based synchronization detection apparatus. The OFDM-based synchronization detection apparatus includes m registers which store input data; m shifters which shift outputs of the registers by as much as an exponent of a $2^n$-level quantized correlation coefficient for synchronization detection (n is an integer not less than 0); an adder which adds outputs of the shifters; and a peak detector which detects a peak value among outputs of the adder.

The $2^n$-level quantized correlation coefficient is obtained by proportionally scaling up a correlation coefficient using $2^n$ and approximating the scaled-up correlation coefficient to $2^i$ (i=0, 1, . . . , n).

In scaling up the correlation coefficient, a correlation coefficient c*(m) is normalized using an equation $$x = \frac{2^n c^*(m)}{\max c^*(m)}.$$

In approximating the scaled-up correlation coefficient, the normalized value x is approximated to a predetermined value $Q_L$ and $$Q_L[x] = \begin{cases} 2^{\lfloor \log_2 x \rfloor}, & x > 0 \\ -2^{\lfloor \log_2 (-x) \rfloor}, & x < 0 \\ 0, & x = 0 \end{cases}$$

(where $\lfloor \log_2 x \rfloor$ indicates an integer closest to $\log_2 x$).

Additional aspects and/or advantages of the invention will be set forth in part in the description which follows and, in part, will be obvious from the description, or may be learned by practice of the invention.

According to another aspect of the present invention, there is provided an OFDM-based synchronization detection method. The OFDM-based synchronization detection method involves quantizing correlation coefficients for synchronization detection into $2^n$-level quantized correlation coefficients (n is an integer not less than 0); shifting input data using the $2^n$-level quantized correlation coefficients; and detecting synchronization using a shifting result.

In shifting the input data, the input data is shifted by the number of bits, which equals the exponent of the $2^n$-level quantized correlation coefficient.

Quantizing a correlation coefficient involves scaling up the correlation coefficient using $2^n$; and approximating the scaled-up correlation coefficient to $2^i$ (I=0, 1, . . . , n).

In scaling up the correlation coefficient, a correlation coefficient c*(m) is normalized using an equation $$x = \frac{2^n c^*(m)}{\max c^*(m)}.$$

In approximating the scaled-up correlation coefficient, the normalized value x is approximated to a predetermined value $Q_L$ and $$Q_L[x] = \begin{cases} 2^{\lfloor \log_2 x \rfloor}, & x > 0 \\ -2^{\lfloor \log_2 (-x) \rfloor}, & x < 0 \\ 0, & x = 0 \end{cases}$$

(where $\lfloor \log_2 x \rfloor$ indicates an integer closest to $\log_2 x$).

Detecting synchronization involves adding shifting results; and detecting a peak value among adding results.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
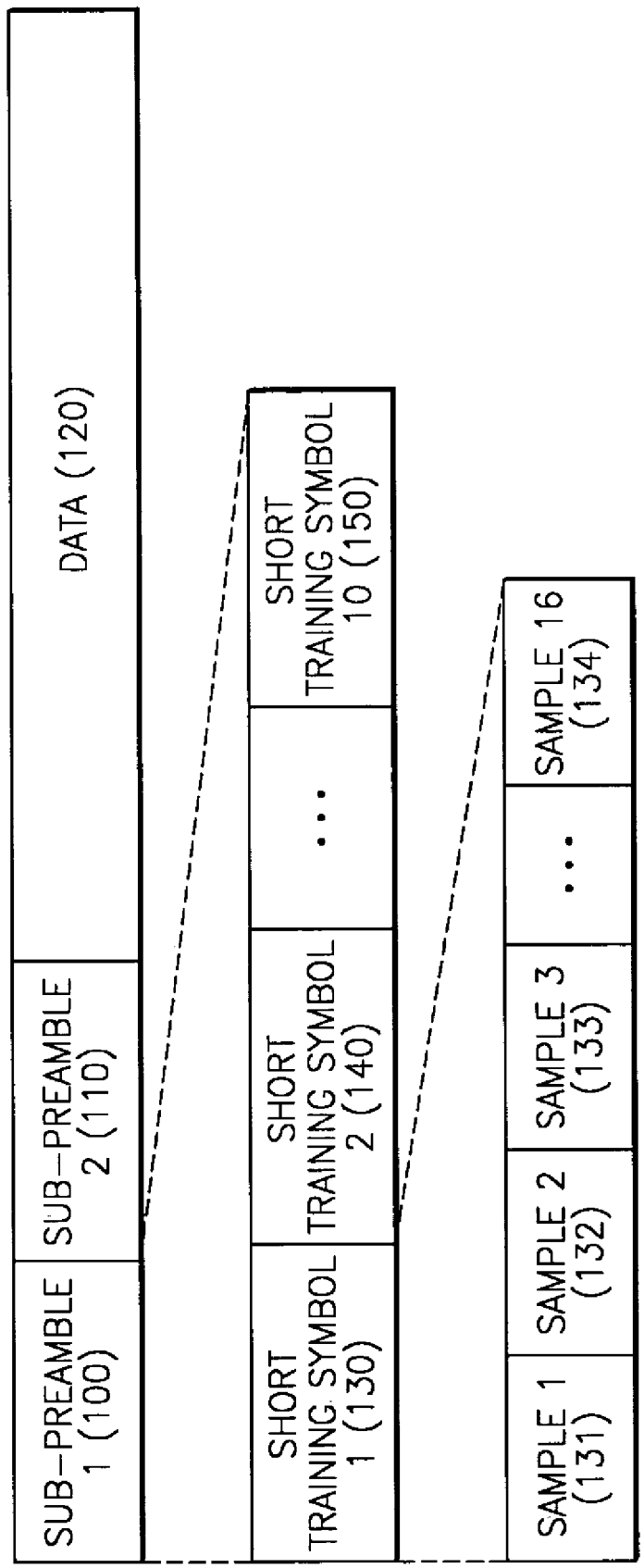
FIG. 1 is a diagram illustrating a conventional transmission data structure defined by wireless local area network (WLAN) standards.
Figure 2:
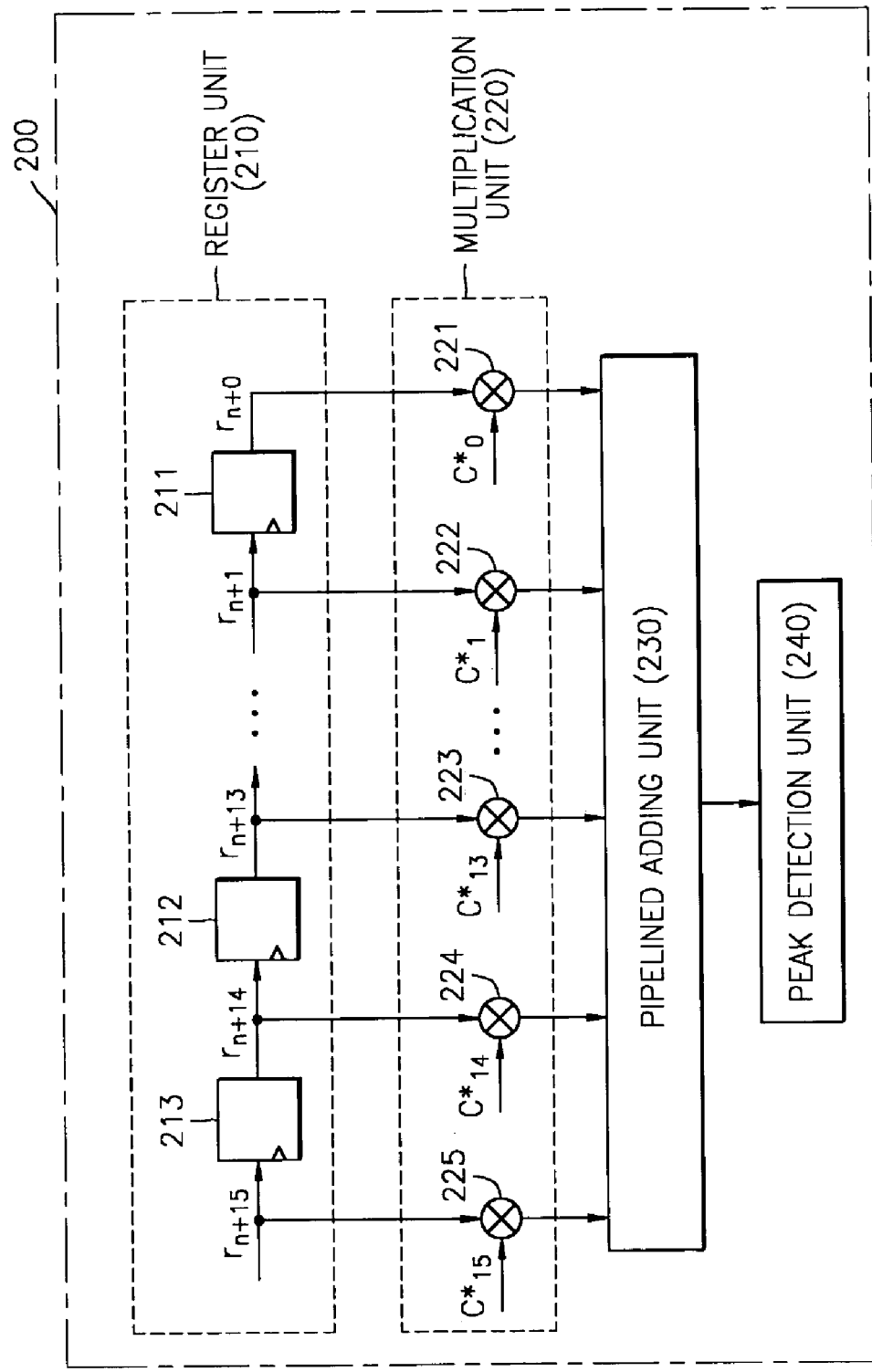
FIG. 2 is a block diagram of a conventional WLAN correlator for detecting synchronization.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
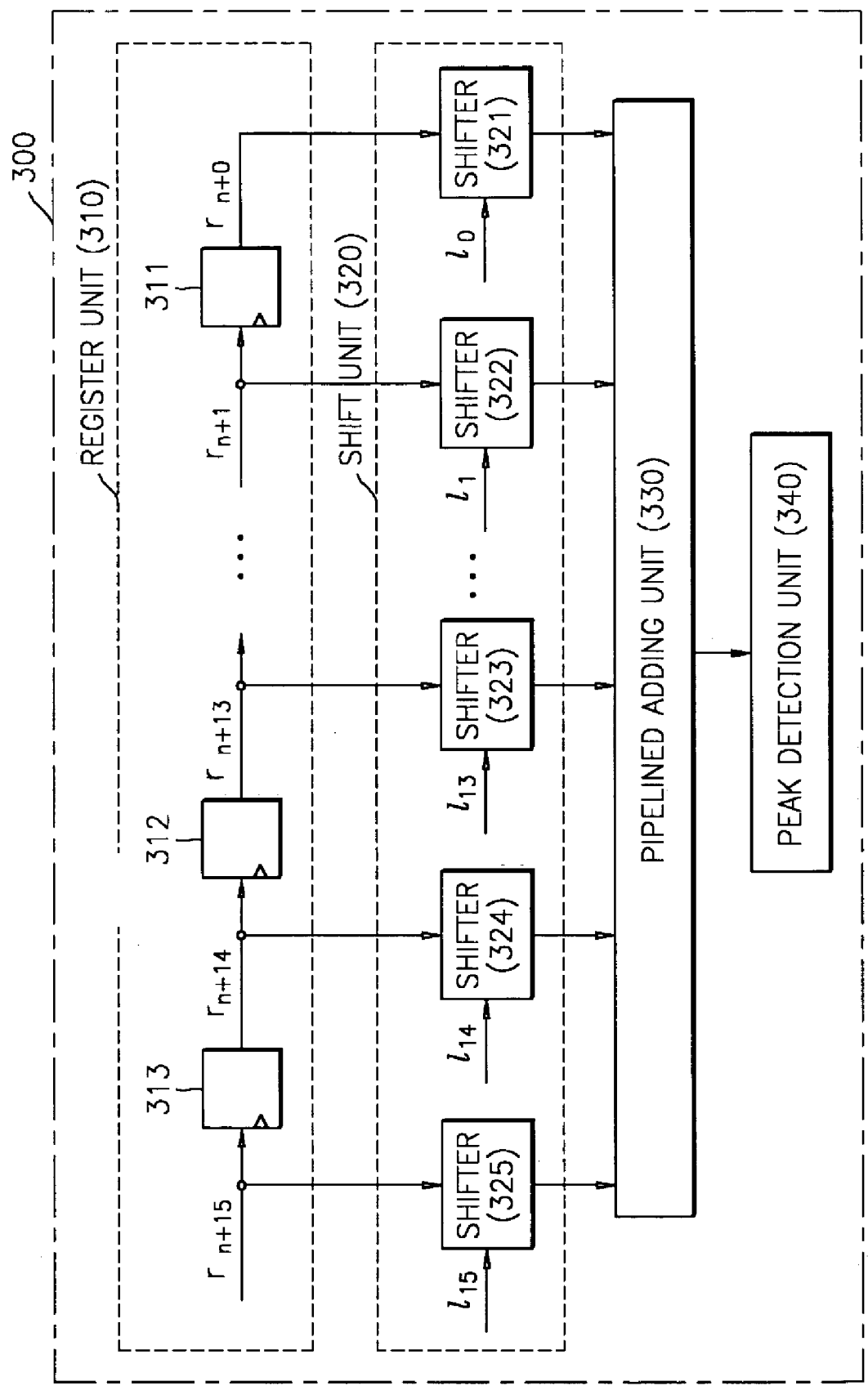
FIG. 3 is a block diagram of a WLAN correlator for detecting synchronization according to an embodiment of the present invention.

FIG. 3 is a block diagram illustrating a correlator according to an embodiment of the present invention. Referring to FIG. 3, a correlator 300 includes a register unit 310, a shift unit 320, a pipelined adding unit 330, and a peak detection unit 340. The register unit 310 includes registers that each store one sample of input data. The shift unit 320 shifts each output value of the register unit 310 by as much as the correlation coefficient quantized to a $2^n$ level. The pipelined adding unit 330 adds the output values of the shift unit 320. The peak detection unit 340 detects a peak value among output values of the pipelined adding unit 330.

The register unit 310 includes a first register 311, . . . , a fifteenth register 312, and a sixteenth register 313, and the shift unit 320 includes a first shifter 321, . . . , and a sixteenth shifter 325. On each clock, a data sample is input into the correlator 300. A data sample received on a predetermined clock is temporarily stored in a predetermined register of the register unit 310. Then, on the next clock, the data sample is passed on to the register located immediately to the right of the predetermined register. Thus, for example, after 16 clocks, all data samples $r_{n+0}, \ldots, r_{n+15}$ are sequentially stored in the first through sixteenth registers 211 through 213, respectively.

Then, on the next clock, the data sample $r_{n+0}$ is output to the first shifter 321 and shifted by $I_0$ bits. In the same manner, the second through sixteenth data samples $r_{n+1}$ through $r_{n+15}$ are output to their corresponding shifters 322 through 325 and then shifted by $I_1$ through $I_{15}$ bits, respectively. All these shifted data samples are output to the pipelined adding unit 330 and summed, and the peak detection unit 340 detects a peak value among the results output from the pipelined adding unit 330, while sensing values output from the pipelined adding unit 330.

A short training symbol, used for detecting timing synchronization at a reception end according to IEEE802.11a standards, is determined in advance. An aspect of the present invention is that multiplication can be carried out with the help of a shifter by quantizing such previously determined correlation coefficients into a $2^n$ level.

A method of quantizing correlation coefficients into a $2^n$ level will be described in greater detail with reference to FIGS. 4 and 5.

Figure 4:
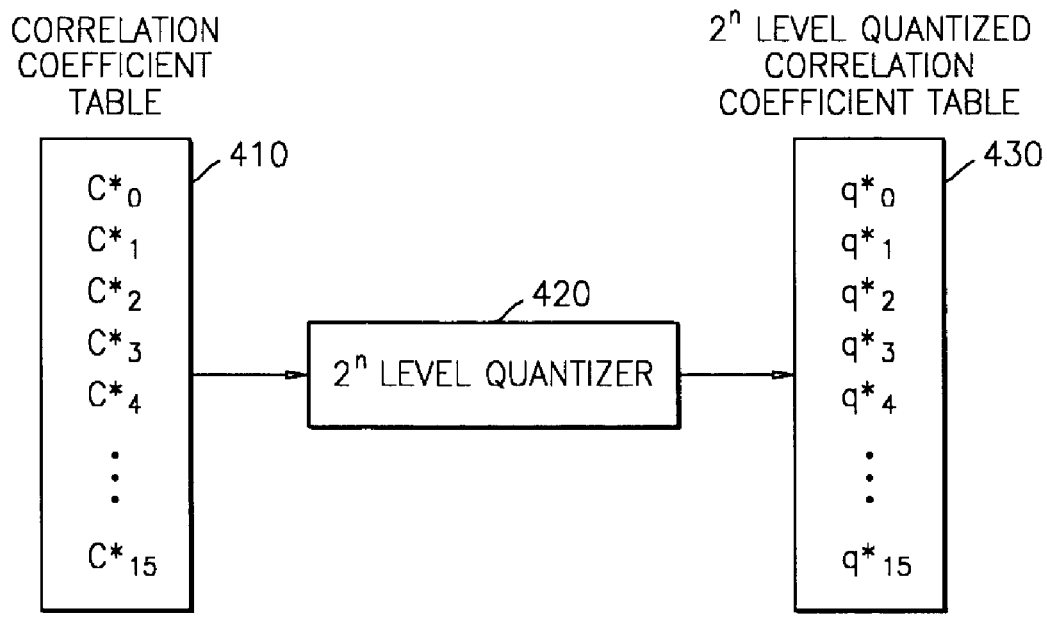
FIG. 4 is a diagram illustrating $2^n$-level quantized correlation coefficients used in the WLAN correlator of FIG. 3.

In this embodiment of the present invention, as shown in FIG. 4, correlation coefficients in a correlation coefficient table 410 are quantized into a $2^n$ level by using a $2^n$ level quantizer 420, and then the $2^n$-level quantized correlation coefficients are written in a $2^n$-level quantized correlation coefficient table 430. Thereafter, the $2^n$-level quantized correlation coefficient table 430, rather than the correlation coefficient table 410, is used for synchronization detection.

A method of quantizing an input data sample into a $2^n$ level is as follows. For example, $2^1$-level quantization quantizes a correlation coefficient into $-2^1$, $-2^0$, 0, $2^0$, or $2^1$. Therefore, among correlation coefficients between $-2$ and $-1$, the one closer to $-2$ is quantized into $-2$, and the one closer to $-1$ is quantized into $-1$. Correlation coefficients between 0 and 1 are quantized into either 0 or 1 depending on whether they are closer to 0 or 1, and correlation coefficients between 1 and 2 are quantized into either 1 or 2 depending on whether they are closer to 1 or 2. In addition, in the case of $2^2$-level quantization, a correlation coefficient is quantized into $-2^2$, $-2^1$, $-2^0$, 0, $2^0$, $2^1$, or $2^2$. Furthermore, in the case of $2^3$-level quantization, a correlation coefficient is quantized into $-2^3$, $-2^2$, $-2^1$, $-2^0$, 0, $2^0$, $2^1$, $2^2$, or $2^3$-level quantization, a quantization levels are possible and may be carried out similarly and will not be described in detail.

Figure 5:
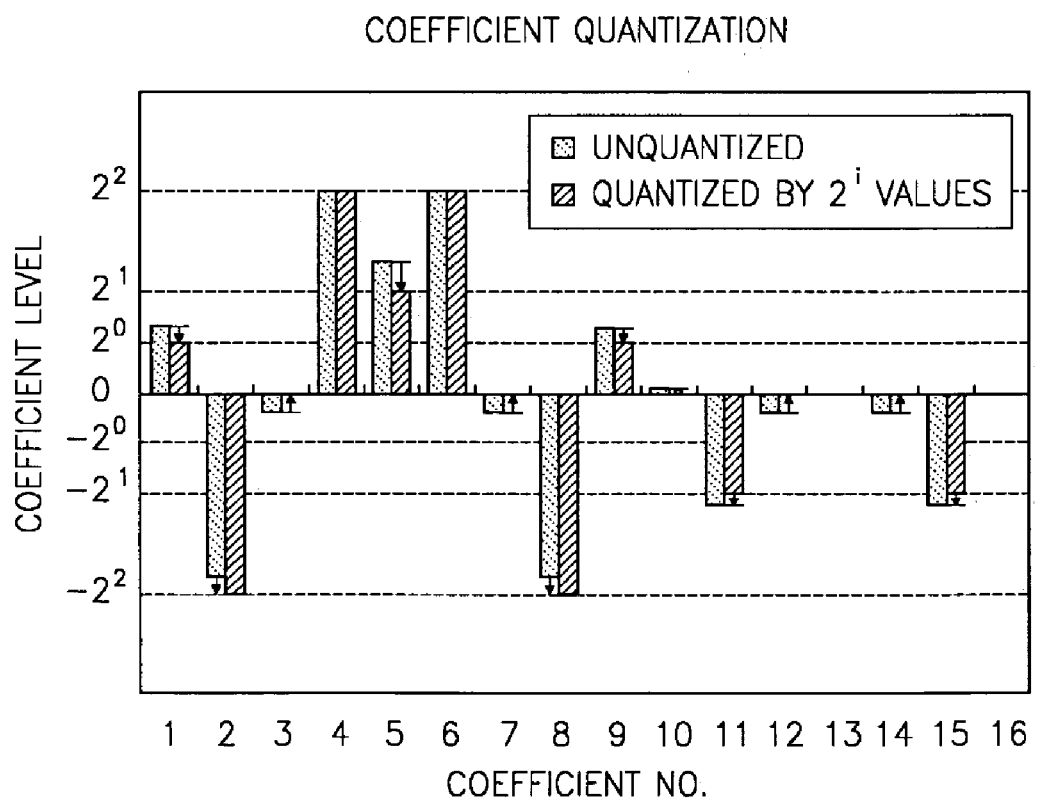
FIG. 5 is a graph illustrating $2^n$-level quantization carried out in the WLAN correlator of FIG. 3.

FIG. 5 shows $2^2$-level quantized correlation coefficients. As shown in FIG. 5, $2^2$-level quantization quantizes correlation coefficient No. 1 into $2^0$ because correlation coefficient No. 1, which is in the range from $2^0$ to $2^1$, is closer to $2^0$ than to $2^1$. Likewise, correlation coefficient No. 2, which is in the range from $-2^1$ and $-2^2$, is quantized into $-2^2$ because correlation coefficient No. 2 is closer to $-2^2$ than to $-2^1$. In similar fashion, each correlation coefficient is quantized into a value that can be expressed in the form of $2^n$. Thus, without using a multiplier to multiply an input data sample by a correlation coefficient, a desired multiplication effect can be obtained by using a shifter and a $2^n$-level quantized correlation coefficient. For example, by simply shifting 2 bits, the same results achieved by multiplying an input data sample by a $2^2$-level quantized correlation coefficient can be obtained. The $2^n$-level quantization that has been described so far will become more apparent in the following paragraphs.

In this embodiment of the present invention, the correlator quantizes a correlation coefficient $c^*(m)$ so that an in-phase component and a quadrature component of $c^*(m)$ are transformed into the $2^i$ form, while a conventional correlator directly uses such a correlation coefficient without quantizing it. In FIG. 5, lighter portions represent correlation coefficients' in-phase components that are generally used in a conventional correlator, and darker portions represent the $2^i$-level quantized correlation coefficients' in-phase components. The maximum quantization value or scaling-up coefficient for quantizing $c^*(m)$ is $2^2$.

A multiplier of the correlator, for synchronization detection according to the present invention, may be unnecessary and may be replaced by a shifter due to the following process. Equation (2) below is obtained by replacing the correlation coefficient $c^*(m)$ in Equation (1) with a quantized correlation coefficient $q^*(m)$.

$$\Lambda(n) = \sum_{m=1}^{M} r(n+m)q^*(m) \qquad (2)$$

Equation (3) below represents a process of scaling up $c^*(m)$ using $2^n$. In other words, Equation (3) below represents the process of quantizing correlation coefficients ($c^*(m)$) by replacing the maximum among the correlation coefficients with $2^n$, normalizing the remainder, and using a quantization function $Q_L(x)$.

$$q^*(m) = Q_L\left[\frac{2^i c^*(m)}{\max c^*(m)}\right] \qquad (3)$$

In Equation (3), the quantization function $Q_L(X)$, as shown in Equation (4) below, indicates a complex quantization function by which each normalized correlation coefficient is quantized into a $2^i$-level value.

$$Q_L[x] = Q[\operatorname{Re}\{x\}] + jQ[\operatorname{Im}\{x\}] \qquad (4)$$

$Q_L(x)$ can also be expressed by Equation (5) below.

$$Q_L[x] = \begin{cases} 2^{\lfloor \log_2 x \rfloor}, & x > 0 \\ -2^{\lfloor \log_2(-x) \rfloor}, & x < 0 \\ 0, & x = 0 \end{cases} \qquad (5)$$

In Equation (5), $\lfloor a \rfloor$ indicates the integer closest to a, where a represents either $\log_2 x$ or $\log_2(-x)$. Through the above-mentioned quantization, $q^*(m)$ can be expressed by $2^i$, a correlation coefficient multiplier can be replaced by an i-bit shifter, and Equation (1) can be rearranged into Equation (6) below.

$$\Lambda(n) = \sum_{m=1}^{M} \operatorname{sign} \times [r(n+m) \langle\langle l(m)] \qquad (6)$$

$$l(m) = \begin{cases} \log_2 |q^*(m)|, & q^*(m) \neq 0 \\ 0, & q^*(m) = 0 \end{cases} \qquad (7)$$

$$\operatorname{sign} = \begin{cases} +1, & q^*(m) > 0 \\ -1, & q^*(m) < 0 \\ 0, & q^*(m) = 0 \end{cases} \qquad (8)$$

In Equation (6), $r(n+m) << l(m)$ indicates that $r(n+m)$ should be shifted to the left by as many as $l(m)$ bits. Equation (7) represents a process of converting a $2^n$-quantized correlation coefficient $q^*(m)$ into $l(m)$. Here, $l(m)$ indicates the exponent of the $2^n$-quantized correlation coefficient $q^*(m)$. By shifting input data by as much as the exponent, the same results achieved by multiplication can be obtained.

Figures 6, 7:
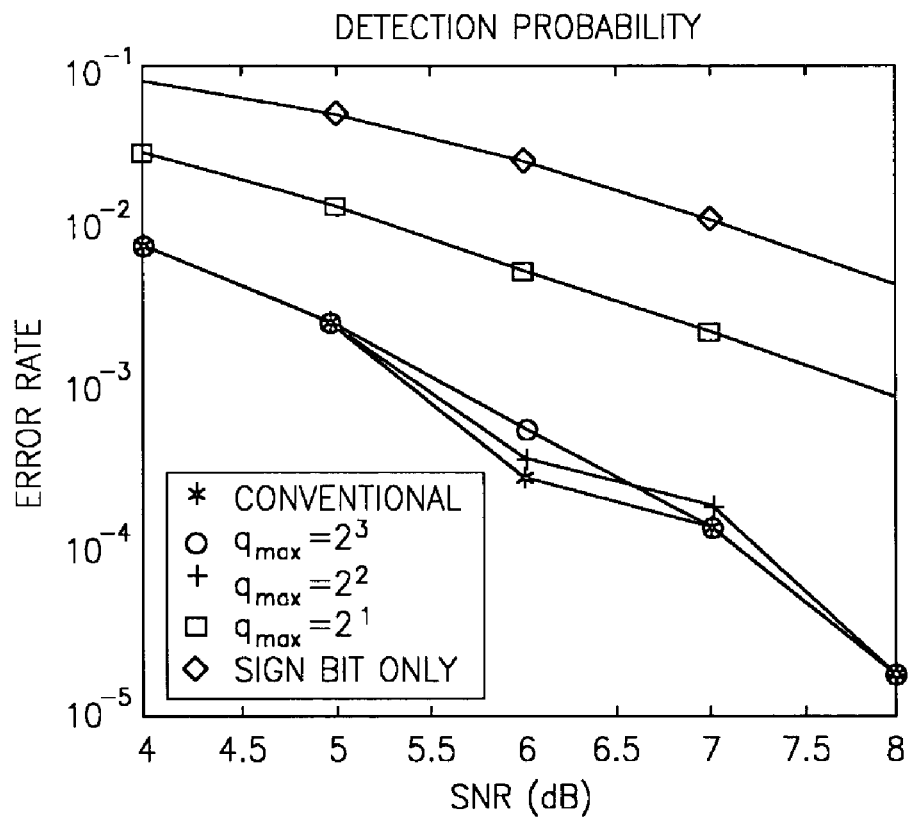
FIG. 6 is a graph illustrating the performance of a correlator according to an embodiment of the present invention.
FIG. 7 is a table for comparing correlator hardware according to an embodiment of the present invention to conventional correlator hardware.

FIG. 6 illustrates timing synchronization detection using three short training symbols according to the IEEE802.11a standards. In FIG. 6, 'conventional' represents the performance of a system adopting a conventional correlator that uses non-quantized training symbols, and 'sign bit only' represents a method of obtaining cross-correlation values using predetermined values quantized in a manner that only considers the signs of a signal so that positive values are quantized into +1 and negative values are quantized into −1.

FIG. 6 shows synchronization detection error rates for some signal-to-noise ratio in an additive white gaussian noise (AWGN) channel. As shown in FIG. 6, the correlator according to the present invention exhibits nearly the same performance as the conventional correlators, especially when a quantization maximum qmax of a correlation coefficient is $2^2$ or $2^3$. Even though the correlator according to the present invention has poorer performance when the quantization maximum q max is $2^1$, the present invention still has better performance than its counterpart when adopting the 'sign-bit-only' manner. In short, when the quantization maximum is not smaller than $2^2$, the present invention can successfully provide advantages without deteriorating timing synchronization detection.

FIG. 7 is a table in which the correlator according to this embodiment of present invention is compared to the conventional correlator in terms of hardware size.

For a better and more efficient evaluation of the complexities of hardware constituting the correlator according to the present invention and the conventional correlator, both correlators were manufactured by assembling a plurality of gate-level circuits. As shown in FIG. 7, the correlator according to the present invention required only about 10% of the hardware that is used to constitute the conventional correlator.

More specifically, the conventional correlator requires 16 8×8 multipliers, 15 8-bit registers, and a 16-bit adder, which amounts to 9495 gates. However, the correlator according to the present invention only requires 15 8-bit registers and a 11-bit adder, which amounts to 978 gates. This indicates that the correlator according to the present invention can be implemented with only about 10.3% of the gates that are required by the conventional correlator.

The correlator for detecting synchronization at a reception end of an OFDM-based system according to the present invention uses a shifter rather than a multiplier because it uses $2^n$-level quantized correlation coefficients rather than non-quantized correlation coefficients. Therefore, according to this embodiment of the present invention, it is possible to simplify the hardware structure of a correlator without any performance deterioration.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An orthogonal frequency division multiplexing (OFDM)-based synchronization detection apparatus, comprising:
   m registers which store input data;
   m shifters which shift outputs of the registers by as many as an exponent of a $2^n$-level quantized correlation coefficient for synchronization detection (n is an integer not less than 0);
   an adder which adds outputs of the shifters; and
   a peak detector which detects a peak value among the outputs of the adder,
   wherein the $2^n$-level quantized correlation coefficient is obtained by proportionally scaling up a correlation coefficient using $2^n$ and approximating the scaled-up correlation coefficient to $+/-2^i$ (i=0, 1, ..., n).

2. The apparatus of claim 1 wherein in the scaling up the correlation coefficient, a correlation coefficient c*(m) is normalized using an equation $$x = \frac{2^n c^*(m)}{\max c^*(m)}.$$

3. The apparatus of claim 2, wherein in the approximating the scaled-up coefficient, the normalized value x is approximated to a predetermined value $Q_L$ and $$Q_L[x] = \begin{cases} 2^{\lfloor \log_2 x \rfloor}, & x > 0 \\ -2^{\lfloor \log_2(-x) \rfloor}, & x < 0 \\ 0, & x = 0 \end{cases}$$

(where $\lfloor \log_2 x \rfloor$ indicates an integer closest to $\log_2 x$).

4. An OFDM-based synchronization detection method, comprising:
   quantizing correlation coefficients for synchronization detection into $2^n$-level quantized correlation coefficients (n is an integer not less than 0);
   shifting input data using the $2^n$-level quantized correlation coefficients to determine shifting results; and
   detecting synchronization using the shifting results,
   wherein the quantizing a correlation coefficient comprises scaling up the correlation coefficient using $2^n$ and approximating the scaled-up correlation coefficient to $+/-2^i$ (I=0, 1, ..., n).

5. The method of claim 4, wherein in the shifting the input data, the input data is shifted by a predetermined number of bits, which is the exponent of the 2n-level quantized correlation coefficient.

6. The method of claim 4, wherein in the scaling up the correlation coefficient, a correlation coefficient c*(m) is normalized using an equation $$x = \frac{2^n c^*(m)}{\max c^*(m)}.$$

7. The method of claim 6, wherein in approximating the scaled-up correlation coefficient, the normalized value x is approximated to a predetermined value $Q_L$ and $$Q_L[x] = \begin{cases} 2^{\lfloor \log_2 x \rfloor}, & x > 0 \\ -2^{\lfloor \log_2(-x) \rfloor}, & x < 0 \\ 0, & x = 0 \end{cases}$$

(where $\lfloor \log_2 x \rfloor$ indicates an integer closest to $\log_2 x$).

8. The method of claim 4, wherein the detecting the synchronization comprises:
   adding the shifting results to produce adding results; and
   detecting a peak value among the adding results.

9. An orthogonal frequency division multiplexing (OFDM)-based synchronization detection apparatus, comprising:
   an input register storing data;
   a shifter wherein data from the input register is shifted based on an exponent of a quantized correlation coefficient;

an adder wherein the shifted data is summed;

a peak detector wherein a peak value is determined from the summed shifted output for synchronization; and a $2^n$ level quantizer, wherein a standard correlation coefficient is quantized into a $2^n$ level, wherein the quantized correlation coefficient is determined, wherein the $2^n$ level quantizer approximates the standard correlation coefficient by scaling the correlation coefficient, $c^*(m)$, into discrete levels by rounding normalized correlation coefficients to the nearest whole integer represented by $2^n$.

10. The apparatus of claim 9, wherein a table of quantized correlation coefficients is stored to use in shifting the data left by the number of bits in the exponent of the corresponding quantized correlation coefficient.

11. The apparatus of claim 9, wherein the maximum quantization level is greater than or equal to $2^2$.

12. The apparatus of claim 9, wherein the input register further comprises individual registers that each store a sample of the data.

13. The apparatus of claim 12, wherein the data samples move to the next register upon a clock cycle.

14. The apparatus of claim 13, wherein the data samples are output to the shifter after sixteen clock cycles.

15. A method of synchronization detection in an orthogonal frequency division multiplexing (OFDM) receiver comprising:

storing input data in a register;

calculating a quantized correlation coefficient from a standard correlation coefficient based on $2^n$ level;

shifting the input data using a number of bits corresponding to an exponent of the quantized correlation coefficient;

adding the shifted input data; and scanning the adding the shifted input data for a peak value wherein synchronization is detected, wherein the calculating the quantized correlation coefficient includes normalizing a standard correlation coefficient and rounding the normalized standard correlation coefficient to the nearest whole integer represented by $2^n$.

* * * * *

UNITED STATES PATENT AND TRADEMARK OFFICE
CERTIFICATE OF CORRECTION

PATENT NO. : 7,263,131 B2 Page 1 of 1
APPLICATION NO. : 10/702034
DATED : August 28, 2007
INVENTOR(S) : Tae-Hyeun Ha et al.

It is certified that error appears in the above-identified patent and that said Letters Patent is hereby corrected as shown below:

Column 8, Line 11, after "scaled-up" insert --correlation--.

Column 9, Line 3, change "synchronization;" to --synchronization detection;--.

Column 9, Line 9, change "scalinq" to --scaling--.

Column 9, Line 10, change "roundinq" to --rounding--.

Signed and Sealed this

First Day of January, 2008

JON W. DUDAS
*Director of the United States Patent and Trademark Office*